(12) United States Patent
Hayes et al.

(10) Patent No.: US 7,139,806 B2
(45) Date of Patent: Nov. 21, 2006

(54) COMMUNICATION SYSTEM FOR PROVIDING DYNAMIC MANAGEMENT OF CONTACTS AND METHOD THEREFOR

(75) Inventors: David J. Hayes, Lake Worth, FL (US); Eric T. Eaton, Lakeworth, FL (US); Von Mock, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 806 days.

(21) Appl. No.: 10/268,825

(22) Filed: Oct. 10, 2002

(65) Prior Publication Data

US 2004/0073643 A1 Apr. 15, 2004

(51) Int. Cl.
*G06F 15/16* (2006.01)
(52) U.S. Cl. ............... 709/207; 709/200; 709/206
(58) Field of Classification Search ............... 709/223
See application file for complete search history.

(56) References Cited

U.S. PATENT DOCUMENTS

| | | | | |
|---|---|---|---|---|
| 6,677,968 B1* | 1/2004 | Appelman | ........... | 715/853 |
| 2001/0009014 A1* | 7/2001 | Savage et al. | ........... | 709/204 |
| 2002/0097856 A1 | 7/2002 | Wullert, III | | |
| 2002/0103862 A1 | 8/2002 | Burr | | |
| 2003/0052915 A1* | 3/2003 | Brown et al. | ........... | 345/752 |
| 2003/0065721 A1* | 4/2003 | Roskind | ........... | 709/204 |
| 2003/0106022 A1* | 6/2003 | Goodacre et al. | ........... | 715/513 |
| 2004/0059781 A1* | 3/2004 | Yoakum et al. | ........... | 709/204 |

FOREIGN PATENT DOCUMENTS

EP 1176840 A1 1/2002

* cited by examiner

*Primary Examiner*—Rupal Dharia
*Assistant Examiner*—Nicholas R Taylor
(74) *Attorney, Agent, or Firm*—Randi L. Karpinia; Douglas S. Rupert

(57) ABSTRACT

A communication system (10) for providing dynamic management of a plurality of contacts (215) includes a messaging server (120) and a plurality of communication devices (75). The messaging server (120) dynamically manages the plurality of contacts (215) for each messaging user (205) by using a plurality of contact information (225) for each contact (220) and a plurality of user settings (210) of the messaging user (205) to determine a current priority setting (280) for the contact (220). Each of the plurality of communication devices (75) are used by at least one messaging user (205) for receiving the plurality of contacts (215) and the plurality of contact information (225) from the messaging server (120).

36 Claims, 6 Drawing Sheets

COMMUNICATION SYSTEM FOR PROVIDING DYNAMIC MANAGEMENT OF CONTACTS AND METHOD THEREFOR

BACKGROUND OF THE INVENTION

1. Field of the Invention

This invention relates in general to communication systems and more particularly to communication systems having capability to dynamically manage contacts.

2. Description of the Related Art

With the proliferation of the Internet, the way people communicate is changing. Electronic communication such as electronic mail (email), and real time electronic messaging (e.g. instant messaging and chat messaging) is quickly replacing traditional telephonic communication and handwritten letters. Real time electronic messaging allows the simultaneous access to a message or a plurality of messages by multiple users, with each messaging user capable of inputting a message or a plurality of messages to a session. Each inputted message is relayed to clients operating on devices (such as computers or mobile telephones) of the other messaging users who have chosen to participate in that session. The other session participants can respond with their own messages, which are likewise relayed to all the participating devices. These messages are typically text messages that are delivered to the intended recipient(s) of the message in a real time manner. However, these messages can be in a variety of different media formats or combinations thereof such as audio, animation, video, images, etc. A session history of the messages received and transmitted by all participants involved in the session is typically maintained on the individual participants' devices and typically presented on the screen of the respective device in the form of a scrolling dialog. This text history constitutes one of the attributes of the look and feel of the real time electronic messaging experience.

There are currently several standard methods available for participating in real time messaging communications. For example, personal instant messaging typically occurs between two individuals. An individual can establish a private chat room so that multiple messaging users can participate in a common on-line conversation. Participants gain access to the private chat room by accepting an invitation from the creator of the private chat room. Non-restricted public chat rooms are available to anyone interested in the topic being discussed by simply selecting the desired chat room descriptor on the messaging user's device.

Each messaging session can have various types of session attributes such as session type, session connection info, participants, filter settings, colors, relative font sizes, etc. The messaging user can also have various types of preferences such as colors, relative font sizes, contact lists, nicknames, and parental control settings. These are only a few examples of the attributes and preferences that can effect a messaging session.

In order to utilize real time electronic messaging, a device is pre-configured with, or the messaging user installs, application client software distributed by a particular service provider. The client software connects to a message server for communication. To access the message server, via a logon procedure, the client sends the routing information (e.g. IP address and number of the port assigned to the client, mobile phone number) of the device being used, the username, the messaging user's password, and the messaging user's current availability setting to the message server. The message server temporarily stores the routing and availability information for the messaging user's device.

In response to the messaging user's login information (username and password), the message server provides the client with the messaging user's contact list. The message server then determines the presence and availability of the contacts in that contact list. If the message server finds any of the contacts logged in (i.e. presence setting is online), it sends a message back to the client on the messaging user's device with the presence and availability information for that contact. The message server also sends the messaging user's presence and availability information to the contacts that have the messaging user in their contact list. The messaging user can click on the name of a person in his/her contact list who is online, and a window is created in which the messaging user can enter a message. The messaging user enters a message and clicks "send" to communicate with that person. The other person gets the message and can respond. Messages can be addressed directly to the messaging user's device or can be addressed to the username and sent via the message server.

When the messaging session is complete, the participating messaging users close the message window for that messaging session. When the messaging user signs off, his/her messaging client sends a message to the message server to terminate the messaging user's participation in the plurality of messaging sessions. The message server then sends an update of the messaging user's presence and availability information to the people that have the messaging user in their contact list to indicate the messaging user has signed off. Finally, the message server discards the routing and availability information for the messaging user's device.

The contact list feature enables a messaging user to create, organize, and manage a list of online friends, family members, and co-workers on their computer or from their mobile phone. A contact list window lets a messaging user see which of their contacts are offline or busy, and which are online and ready for messaging. Whenever these contacts sign on, their screen names appear as active in the messaging user's contact list window, allowing the messaging user to communicate with them instantly.

As real time messaging communication such as instant messaging becomes more pervasive, each messaging user's list of contacts having such capability increases. As a result, contact lists are becoming larger and more difficult to manage and interruptions from contacts wanting to communicate or notifications of changes in a contacts status are becoming more frequent. In a wireless environment, the larger contact list also means an increase in data being sent via the communication channel for presence updates and real time communication requests.

Current instant messaging systems include a few basic features to aid in contact list and interruption management. For example, a messaging user can create separate folders categories the different types of contacts. (e.g. friends, family, work) Some messaging systems also allow a messaging user to assign a subset of their contact list to be utilized on their mobile device. Some systems also include customizable notification settings for differentiation of the various contacts. (e.g. pop-up a window when Fred's presence changes, but only beep when Joe's presence changes). Visibility settings can also be utilized for differentiation of the messaging user's availability to various contacts. (E.g. invisible to Fred, online but unavailable to Joe, online and available to Donna).

One drawback of the above described methods is that due to the amount of time required to enter all of these settings or to move contacts between various lists, a messaging user is likely to enter the settings only once and is not likely to change them again. But this is counter to the fact that the people a messaging user wants to communicate with will change over time. For example, a messaging user may have a customer relationship with one contact that he would like to maintain by communicating with them at least once a quarter. The messaging user is not interested in this contact's presence information if he just chatted with the contact last week, but is very interested if it's been four months since they last communicated.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
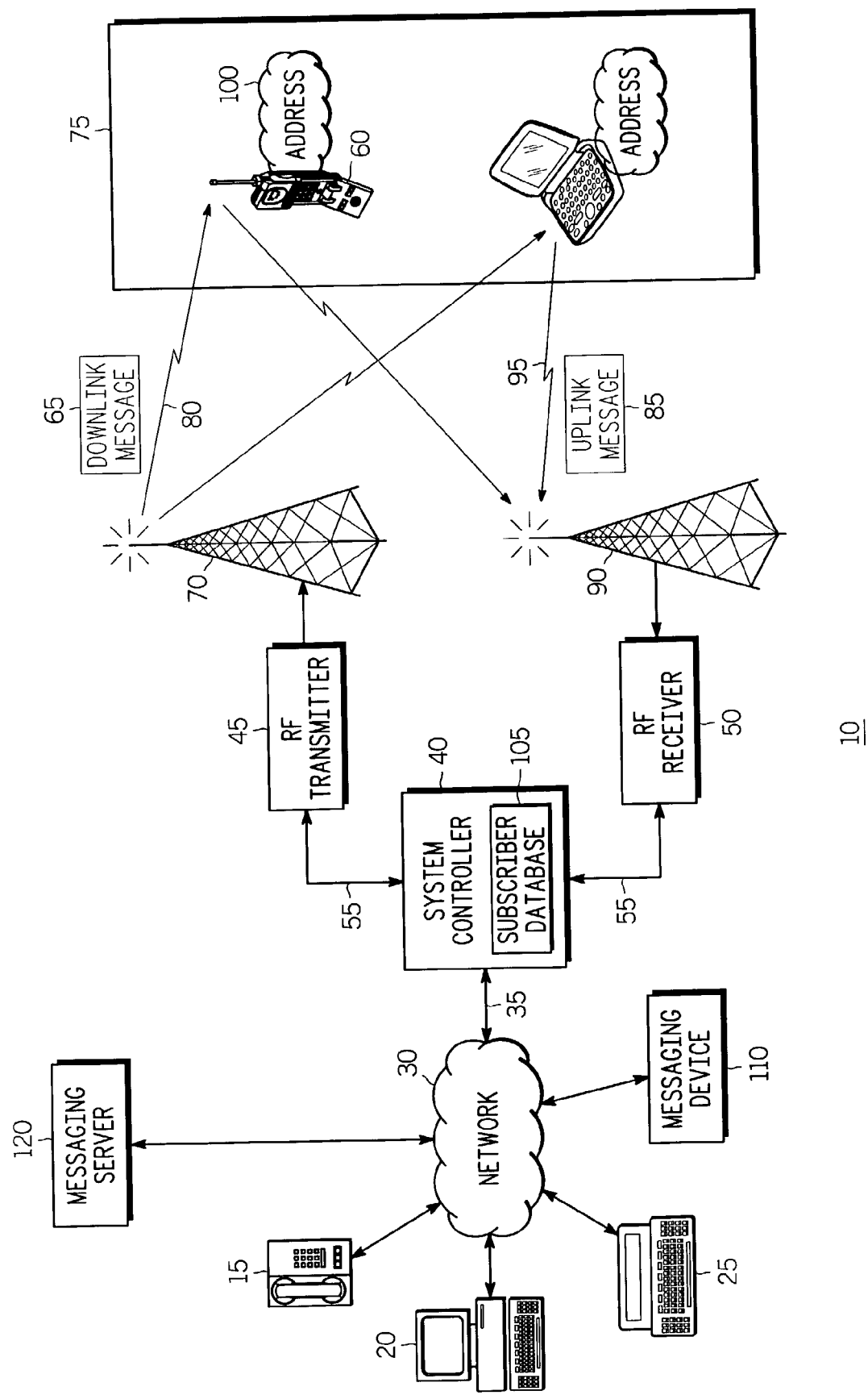
FIG. 1 is an electronic block diagram of a communication system in accordance with a preferred embodiment of the present invention.

Referring to FIG. 1, an electronic block diagram of a communication system 10 for dynamic management of contacts configured for operation in accordance with the present invention is shown. Although FIG. 1 illustrates specifically a wireless communication system, it will be appreciated by those of ordinary skill in the art that the communication system 10 can include any wireless and/or wireline system in accordance with the present invention. The communication system 10 includes a message input device for initiating messages into the communication system 10. It will be appreciated by those of ordinary skill in the art that the message input device can alternatively be external to the communication system 10. The message input device can be, for example, a telephone 15, a computer 20, a desktop messaging unit 25, or a messaging device 110, connected through a conventional network 30 through a plurality of terminal links 35 to a system controller 40. The terminal links 35, for example, can be a plurality of twisted wire pairs, a fiber optic cable, or a multiplexed trunk line.

The system controller 40 is coupled to and oversees the operation of at least one radio frequency (RF) transmitter 45 and at least one radio frequency (RF) receiver 50 through one or more communication links 55. The communication links 55 typically are twisted pair telephone wires, and additionally can include radio frequency (RF), microwave, or other communication links. The radio frequency transmitter 45 and the radio frequency receiver 50 typically are used with message store and forward stations that encode and decode inbound and outbound messages into formats that are compatible with landline message switched computers and personal radio addressing requirements, such as cellular messages, short messaging service, or paging protocols. The system controller 40 can also function to encode and decode wireless messages that are transmitted to or received by the radio frequency transmitter 45 or the radio frequency receiver 50. Telephony signals are typically transmitted to and received from the system controller 40 by telephone sets such as the telephone 15 or a communication device 60. The system controller 40 encodes and schedules outbound messages such as a downlink message 65. The system controller 40 then transmits the encoded outbound messages through the radio frequency transmitter 45 via a transmit antenna 70 to a plurality of communication devices 75 such as the communication device 60 on at least one outbound radio frequency (RF) channel 80. The downlink message 65 can be, for example, a data message or a voice call. Similarly, the system controller 40 receives and decodes inbound messages such as an uplink message 85 received by the radio frequency receiver 50 via a receive antenna 90 on at least one inbound radio frequency (RF) channel 95 from one of a plurality of communication devices 75. The uplink message 85 can be, for example, a data message, a reply to a data message, a voice call, or a reply to a voice call.

It will be appreciated by one of ordinary skill in the art that the communication system 10, in accordance with the present invention, can function utilizing any wireless RF channel, for example, a two-way messaging channel, a mobile cellular telephone channel, or a mobile radio channel. Similarly, it will be appreciated by one of ordinary skill in the art that the communication system 10 can function utilizing other types of wireless communication channels such as infrared channels and/or Bluetooth channels. Similarly, it will be appreciated by one of ordinary skill in the art that the communication system 10 can function utilizing a wireline communication channel such as a local area network (LAN) or a wide area network (WAN) or a combination of both. The LAN, for example, can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or between the devices and the shared resources. The WAN, for example, can use a physical network media such as X.25, Frame Relay, ISDN, Modem dial-up or other media to connect devices or other local area networks. In the following description, the term "communication system" refers to any of the communication systems mentioned above or an equivalent.

Similarly, it will be appreciated by one of ordinary skill in the art that each of the plurality of communication devices 75, such as the communication device 60, in accordance with the present invention, can be a mobile cellular telephone, a mobile radio data terminal, a mobile cellular telephone having an attached data terminal, a personal computer having a communication means either built in or attached, or a two way messaging device. Similarly, each of the plurality of communication devices 75 can operate on a network that uses a physical network such as ARCNET, Ethernet, Token-ring, Local Talk or other network media to connect the computers, which represent wired network nodes into the network. In the following description, the term "communication device" refers to any of the devices mentioned above or an equivalent.

Each of the plurality of communication devices 75 assigned for use in the communication system 10 has an address or identity assigned thereto which is a unique selective call address in the communication system 10. For example, the communication device 60 assigned for use in the communication system 10 has an address 100 assigned thereto which is a unique selective call address in the communication system 10 for the communication device 60. The address 100 enables the transmission of the downlink message 65 from the system controller 40 only to the communication device 60 having the address 100, and identifies the messages and responses received at the system controller 40 from the communication device 60 with the address 100. In one embodiment, each of the plurality of communication devices 75 also has a pin number assigned thereto, the pin number being associated with a telephone number within the network 30. A list of the assigned addresses and correlated telephone numbers for each of the plurality of communication devices 75 is stored in the system controller 40 in the form of a subscriber database 105.

In a preferred embodiment of the present invention, the communication system 10 further includes a messaging server 120. The messaging server 120 preferably manages the communication of a plurality of electronic messages among a plurality of devices including the plurality of communication devices 75, facilitating substantially real time communication among the plurality of devices within the communication system 10. It will be appreciated by one of ordinary skill in the art that one or more messaging servers can be utilized to provide the functions of the messaging server 120, and further that the one or more messaging servers can alternatively be external to the communication system 10.

Figure 2:
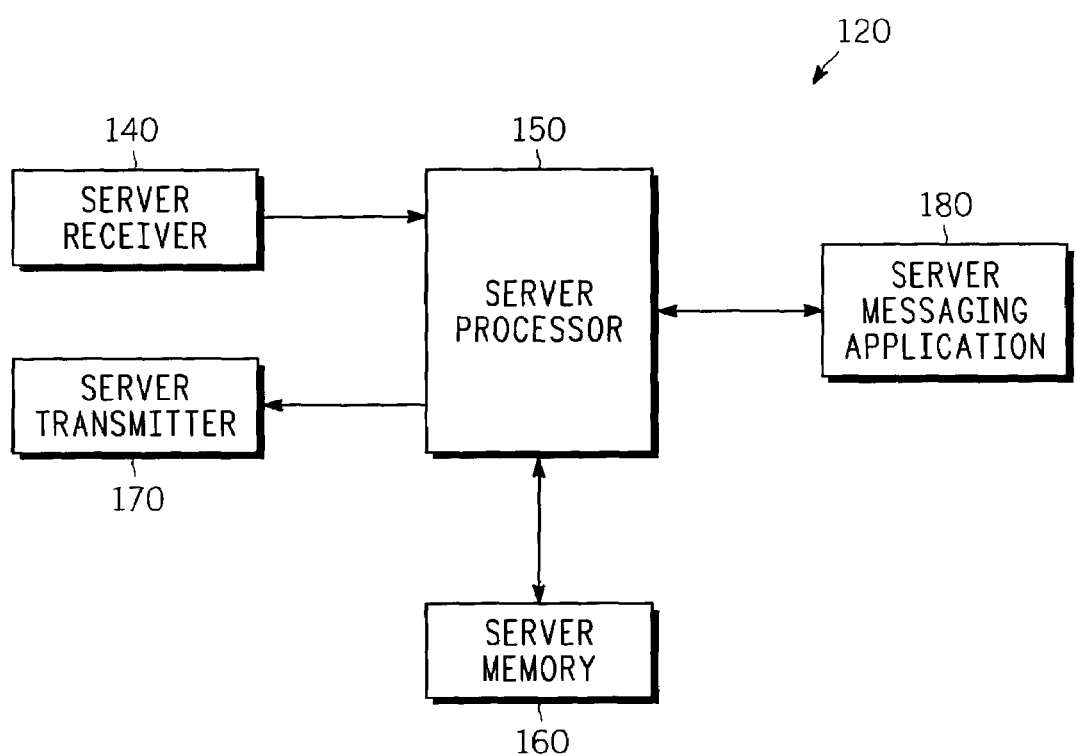
FIG. 2 is an electronic block diagram of a messaging server for use within the communication system of FIG. 1 in accordance with a preferred embodiment of the present invention.

FIG. 2 is an electronic block diagram of the messaging server 120 for use within the communication system 10 of FIG. 1 in accordance with a preferred embodiment of the present invention. The messaging server 120 preferably includes a server receiver 140, a server processor 150, a server memory 160, a server transmitter 170, and a server messaging application 180. In one embodiment of the present invention, the server receiver 140 functions by intercepting transmitted signals from a wireless communication system. It will be appreciated by one of ordinary skill in the art that the server receiver 140 can function by intercepting transmitted signals from any wireless radio frequency (RF) channel, for example, a one or two-way messaging channel, a mobile cellular telephone channel, or a mobile radio channel. Similarly, it will be appreciated by one of ordinary skill in the art that the server receiver 140 can function by intercepting transmitted signals from other types of wireless communication channels such as infrared channels and Bluetooth channels. In another embodiment, the server receiver 140 functions by intercepting signals from a wired communication system, for example from a local area network (LAN) or a wide area network (WAN) or a combination of both. The server receiver 140 can operate by receiving signals from a network that uses a physical network such as ARCNET, Ethernet, Token-ring, Local Talk or other network media. The server receiver 140 can operate by receiving signals over a wired or wireless LAN that employs any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures. Further the server receiver 140 can operate by receiving signals over a wired or wireless WAN that uses a different physical network media such as X.25, Frame Relay, ISDN, Modem dial-up or other media to connect other computers or other local area networks. It will be appreciated by one of ordinary skill in the art that the server receiver 140 can operate using any combination of the communication systems mentioned herein or an equivalent.

Within the server 110, the server receiver 140 is coupled to the server processor 150. The server processor 150 utilizes conventional signal processing techniques for processing received signals from the server receiver 140. Preferably, the server processor 150 is similar to the MC68328 micro-controller manufactured by Motorola, Inc. of Schaumburg, Ill. It will be appreciated that other similar processors can be utilized for the server processor 150, and that additional processors of the same or alternative type can be added as required to handle the processing requirements of the server processor 150.

To perform the necessary functions of the server 110, the server processor 150 is coupled to the server memory 160, which preferably includes a random access memory (RAM), a read-only memory (ROM), an electrically erasable programmable read-only memory (EEPROM), and/or a magnetic storage memory (for example a hard drive).

Figure 3:
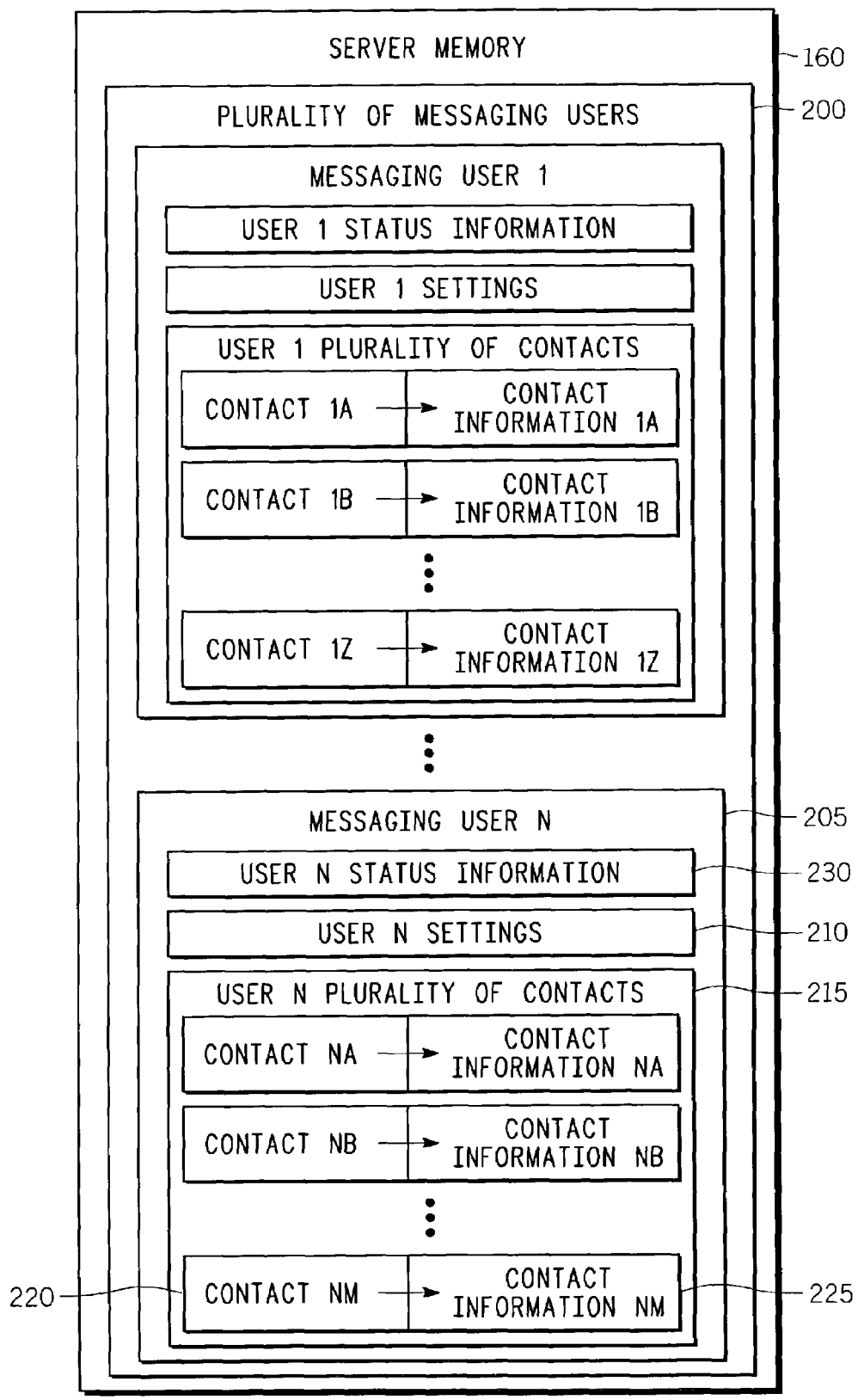
FIG. 3 is an electronic block diagram of a server memory for use within the messaging server of FIG. 2 in accordance with a preferred embodiment of the present invention.

FIG. 3 is an electronic block diagram of the server memory 160 in accordance with a preferred embodiment of the present invention. Preferably, a plurality of contacts 215, a plurality of user status information 230, and a plurality of user settings 210 are stored within the server memory 160 for each messaging user 205 among a plurality of messaging users 200. A plurality of contact information 225 is preferably stored for each contact 220 of the plurality of contacts 215.

The plurality of user status information 230, for example, can include a current location of the messaging user 205, a presence status of the messaging user 205, a mood of the messaging user 205, an availability of the messaging user 205, a communication method for the messaging user 205, and the like. It will be appreciated by one of ordinary skill in the art that the plurality of user status information 230, in accordance with the present invention, can include any of those status indicators mentioned herein or an equivalent.

The plurality of user settings 210 defines certain attributes settable by the messaging user 205 for communicating with the plurality of contacts 215. The plurality of user settings 210, for example, can include text font attributes, filter settings, blocking settings, alert settings, and display settings. In accordance with the present invention, the plurality of user settings 210 further can include maximum settings that limit the number of contacts that can be given certain attributes. Such maximum settings include, for example, a maximum number of mobile contacts for limiting the number of contacts that can be uploaded to the messaging user's mobile communication device; a maximum number of audibly alerted contacts for limiting the number of contacts for which a change in the contact's status information will cause an audible alert; a maximum number of subscribed to contacts for limiting the number of contacts for which changes in the contact's status information are delivered to the communication device 60. It will be appreciated by one of ordinary skill in the art that the plurality of user settings 210, in accordance with the present invention, can include any of the settings mentioned herein or an equivalent.

Figure 4:
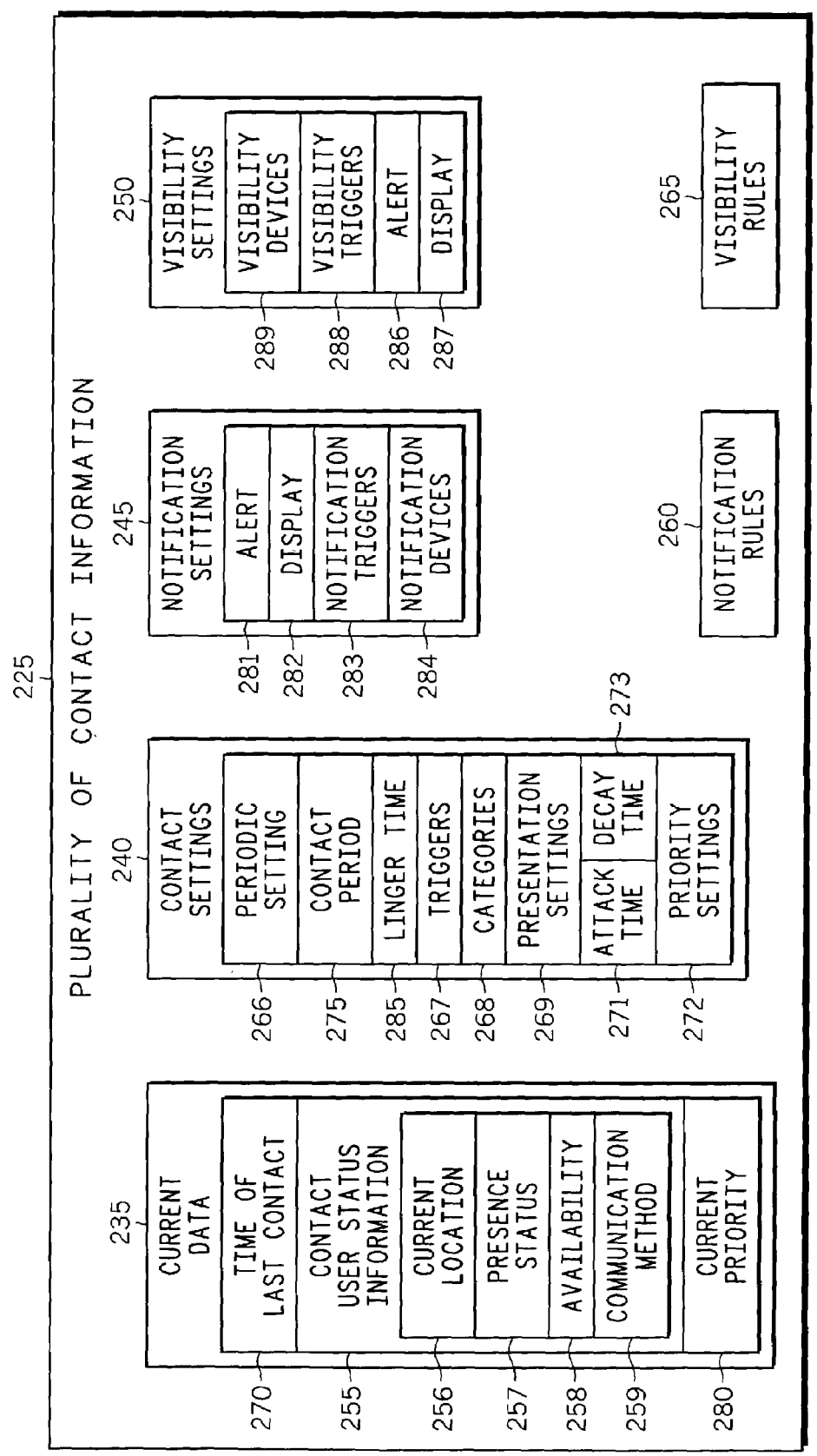
FIG. 4 illustrates one example of contact information stored in the server memory of FIG. 3 in accordance with a preferred embodiment of the present invention.

FIG. 4 illustrates one example of the plurality of contact information 225 for each contact 220 stored in the server memory 160 in accordance with a preferred embodiment of the present invention. The plurality of contact information 225 preferably includes a plurality of current data 235, a plurality of contact settings 240, a plurality of notification rules 260, a plurality of visibility rules 265, a plurality of notification settings 245, and a plurality of visibility settings 250.

The plurality of current data 235 preferably includes the time of last contact 270 between the messaging user 205 and the contact 220. Further, a plurality of contact user status information 255 associated with the contact 220 can be stored within the plurality of current data 235. The plurality of contact user status information 255 for example, can include a current location 256 of the contact 220, a presence status 257 of the contact 220, an availability 258 of the contact 220, a communication method 259 for the contact 220, a mood (not shown) of the contact 220, and the like. It will be appreciated by one of ordinary skill in the art that the plurality of contact user status information 255, in accordance with the present invention, can include any of those status indicators mentioned herein or an equivalent. Alternatively, the plurality of current data 235 includes a pointer or other method of accessing the plurality of user status information 230 associated with the contact 220 which can be equivalent to the plurality of contact user status information 255. In accordance with the present invention, a current priority setting 280 can be stored within the plurality of current data 235. The current priority setting 280 indicates a desired interest by the messaging user 205 in contacting the contact 220 and its value can be automatically determined based on the rest of the plurality of contact information 225.

The plurality of contact settings 240 can include a periodic setting 266 for identifying if the contact 220 is a periodic contact or not. Further, the plurality of contact settings 240 can include a desired contact period 275 indicating how often the communication with the contact 220 is desired. The plurality of contact settings 240 further can include a plurality of priority settings 272 for indicating a desired interest in contacting the contact 220 at predetermined points in time. The plurality of priority settings 272, for example, can include a post contact priority 300, a contact desired priority 310, a minimum priority 305, and the like. The post contact priority 300 can indicate the desired priority of the contact 220 after communication with the contact 220 has occurred. The contact desired priority 310 can indicate the desired priority setting of the contact 220 when the time that has elapsed since the time of last contact 270 is the same as the desired contact period 275. The plurality of contact settings 240 further can include a linger time 285 indicating how long the post contact priority 300 is to be maintained after contact between the messaging user 205 and the contact 220 is achieved. The plurality of contact settings 240 further can include one or more triggers 267 identifying thresholds above and/or below which one or more settings such as one or more notification settings 245 will be changed for the contact 220. The one or more triggers 267 can include, for example, a threshold above which the contact 220 is added to a mobile contact list, and below which the contact 220 is removed from the mobile contact list. It will be appreciated by one of ordinary skill in the art that the trigger thresholds can be based on a time threshold or a priority threshold. The plurality of contact settings 240 further can include one or more categories 268 for which the contact 220 is associated. The one or more categories 268, for example, can be family, friends, business, customer, and the like. The plurality of contact settings 240 can further include presentation settings 269 identified specifically for the contact 220. The presentation settings 269, for example, can include the font, color, graphical image to be displayed in associate with the contact 220 and can include many different settings for use when the contact 220 is at different priority levels. The plurality of contact settings 240 further can include an attack time 271 and/or a decay time 273 indicative of how quickly the priority increases prior to the contact desired time 315 and how quickly the priority decreases after the linger time 285 respectively. It will be appreciated by those of ordinary skill in the art that the plurality of contact settings 240 can include any combination of settings described herein or an equivalent.

The plurality of notification settings 245 defines if and how the messaging user 205 is to be notified of a change in the contact user status information 255 of the contact 220. The plurality of notification settings 245 can include, for example, a notification alerting mechanism 281, a notification display mechanism 282, one or more notification triggers 283, one or more notification devices 284, and the like. The one or more notification triggers 283 can include, for example, which portion of the plurality of current data 235 should cause notifications, if and when availability changes trigger notifications, if and when presence changes trigger notification, and which of the contact's communication devices can trigger a notification. The one or more notification devices 284 can include which of the messaging user's devices should deliver notifications to the messaging user for the contact 220.

The plurality of notification rules 260 are used to translate the plurality of contact settings 240 and the plurality of current data 235 into the plurality of notification settings

245. For example, a notification rule can designate that the contact 220 is not displayed as part of the contact list and that the messaging user 205 is not to be notified of a change in the plurality of contact user status information 255 for the contact 220 when the time that has elapsed since the time of last contact 270 is less than the desired contact period 275. Another notification rule can designate that the contact 220 is displayed as part of the contact list and the messaging user 205 is to be notified of a change in the plurality of contact user status information 255 when the time that has elapsed since the time of the last contact 270 is greater than the desired contact period 275. Another notification rule can designate that the contact 220 is only displayed when the current priority setting 280 of the contact 220 is above a particular trigger.

The plurality of visibility settings 250 defines if and how the contact 220 is to be notified of a change in the plurality of user status information 230 of the messaging user 205. The plurality of visibility settings 250 can include, for example, an alerting mechanism 286, a display mechanism 287, one or more visibility triggers 288, one or more visibility devices 289, and the like. The one or more visibility triggers 288 can, for example, include which portion of the plurality of user status information 230 associated with the messaging user 205 should be visible to the contact 220 (for example the messaging user's location), if and when availability of the messaging user 205 changes should be visible to the contact 220, if and when presence of the messaging user 205 should be visible to the contact 220. The one or more visibility devices 289 can include which of the contact's devices should be used for notification to the contact 220.

The plurality of visibility rules 265 are used to translate the plurality of contact settings 240 and the plurality of current data 235 into the plurality of visibility settings 250. For example, a visibility rule can designate that the contact 220 does not receive notification of changes to the plurality of user status information 230 associated with the messaging user 205 when the time that has elapsed since the time of last contact 270 is less than the desired contact period 275. Another visibility rule can designate that the contact 220 does receive notification of changes to the plurality of user status information 230 associated with the messaging user 205 when the time that has elapsed since the time of the last contact 270 is greater than the desired contact period 275. Another visibility rule can designate that the contact 220 only receives notifications that the messaging user 205 is using a particular device when the current priority setting 280 of the contact 220 is above a particular trigger.

Referring back to FIG. 2, a preferred embodiment the messaging server 120 includes the server messaging application 180. The server messaging application 180 can be hard coded or programmed into the messaging server 120 during manufacturing, can be programmed over-the-air upon customer subscription, or can be a downloadable application. It will be appreciated that other programming methods can be utilized for programming the server messaging application 180 into the messaging server 120. It will be further appreciated by one of ordinary skill in the art that the server messaging application 180 can be hardware circuitry within the messaging server 120. The server messaging application 180 is preferably coupled to the server processor 150 for managing a plurality of messaging functions among the plurality of messaging users 200. In one embodiment of the present invention, the server messaging application 180 dynamically manages the plurality of contacts 215 for each messaging user 205 of the plurality of messaging users 200.

The server messaging application 180 keeps track of the presence status 257 and availability 258 and other user status information 230 of the plurality of messaging users 200. The server messaging application 180 further stores and communicates the plurality of user settings 210, the plurality of contacts 215, and the plurality of contact settings 240 for each messaging user 205 of the plurality messaging users 200. The server messaging application 180 further manages the routing and communication of a plurality of messages among the plurality of messaging users 200. The server messaging application 180 further communicates the user status information 230 of each messaging user 215 to the plurality of messaging users 200.

Figure 5:
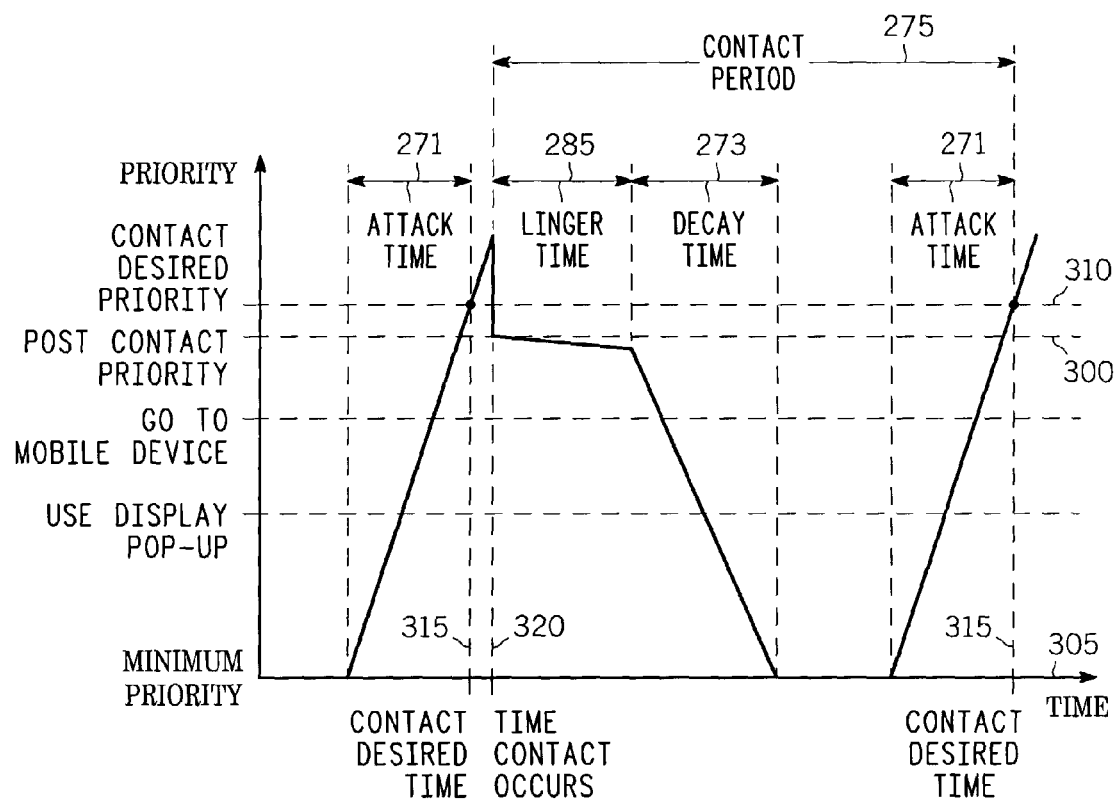
FIG. 5 is a graphical depiction of the operation of a server messaging application for use within the messaging server of FIG. 2 in accordance with a preferred embodiment of the present invention.

FIG. 5 is a graphical depiction of the operation of the server messaging application 180 in accordance with a preferred embodiment of the present invention. Specifically, FIG. 5 is a graph of changes in contact priority over a time period. As illustrated, the server messaging application 180 dynamically manages the plurality of contacts 215 for each messaging user 205 of the plurality of messaging users 200 by using the plurality of contact information 225 for each contact 220 and also the plurality of user settings 210 of the messaging user 205 to determine a current priority setting 280 for the contact 220. The current priority setting 280 changes dependent upon the time since the time of last contact 270 between the contact 220 and the messaging user 205. For example, as illustrated, when the time since the time of last contact 270 is within the linger time 285, the current priority setting 280 of the contact 220 is set to the post contact priority 300. When the time since last contact is within the decay time 273, the current priority setting 280 is decreased dependent upon the elapsed time since the end of the linger time 285 such that the current priority setting 280 is at the minimum priority setting 305 at the end of the decay time 273 and remains there until the commencement of the attack time 271. In one embodiment, as the current priority setting 280 decreases, the plurality of notification settings 245 changes based on each of the stored plurality of triggers 267. When the time since the time of last contact 270 is within the attack time 271, the current priority setting 280 is increased dependent upon the elapsed time since the attack time 271 began such that the current priority setting 280 is at the contact desired priority 310 at the end of the attack time 271 which is the same as the contact desired time 315. In one embodiment, as the current priority setting 280 increases, the plurality of notification settings 245 changes based on each of the stored plurality of triggers 267. In another embodiment, certain attributes are given to the contacts 202 with the highest current priority setting 280. For example, if the maximum number of audibly alerted contacts is set to ten (10), then the ten contacts with the highest current priority setting 280 will cause an audible alert to the messaging user 205. The attack time 271 ends at the contact desired time 315, at which time the current priority setting 280 is set to the contact desired priority 310. At the end of the attack time 271, the current priority setting 280 continues to increase until contact is made between the contact 220 and the messaging user 205.

It will be appreciated by one of ordinary skill in the art that the calculation of the current priority setting 280, the notification settings 245, and the visibility settings 250 can alternatively be performed by the communication device 60 or a combination of the communication device 60 and the messaging server 120. In an alternate embodiment of the present invention the current priority setting 280 as an intermediate value is not used and the notification rules 260 and visibility rules 265 are used to directly translate the plurality of current data 235 and the plurality of contact settings 240 into notification settings 245 and visibility settings 250.

Referring back to FIG. 2, the server transmitter 170 is coupled to and receives one or more command signals from the server processor 150, and in response to a command signal, communicates messages to the communication system 10. In one embodiment of the present invention, the server transmitter 170 functions by sending signals via a wireless communication system. It will be appreciated by one of ordinary skill in the art that the server transmitter 170 can function by sending signals via any wireless radio frequency (RF) channel, for example, a one or two-way messaging channel, a mobile cellular telephone channel, or a mobile radio channel. Similarly, it will be appreciated by one of ordinary skill in the art that the server transmitter 170 can function by sending signals via other types of wireless communication channels such as infrared channels and Bluetooth channels. In another embodiment, the server transmitter 170 functions by sending signals via a wired communication system, for example from a local area network (LAN) or a wide area network (WAN) or a combination of both. The server transmitter 170 can operate by sending signals via a network that uses a physical network such as ARCNET, Ethernet, Token-ring, Local Talk or other network media. The server transmitter 170 can operate by sending signals over a LAN that employs any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures. Further the server transmitter 170 can operate by sending signals over a WAN that uses a different physical network media such as X.25, Frame Relay, ISDN, Modem dial-up or other media to connect other computers or other local area networks. It will be appreciated by one of ordinary skill in the art that the server transmitter 170 can operate using any combination of the communication systems mentioned herein or an equivalent.

Figure 6:
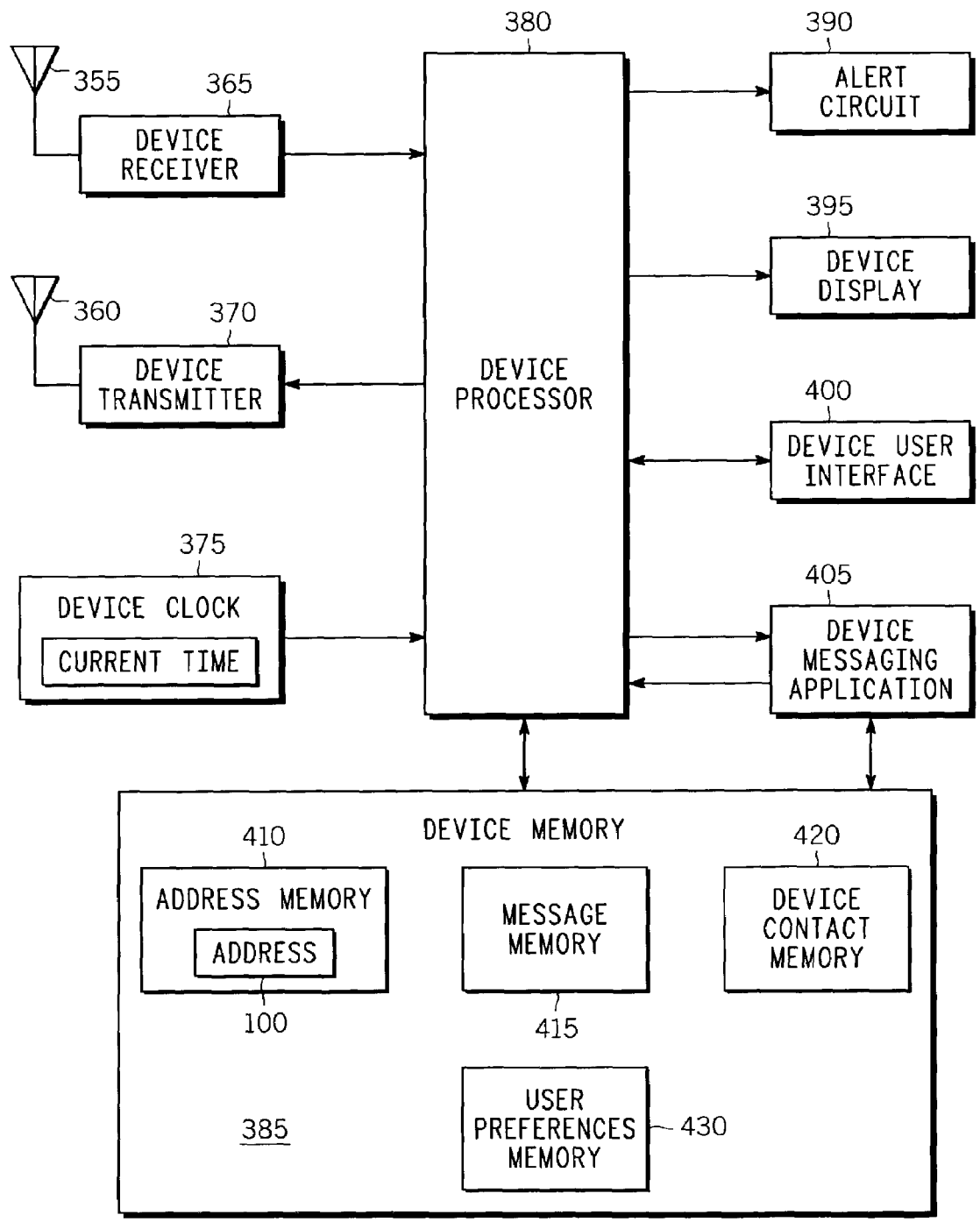
FIG. 6 is an electronic block diagram of a communication device for use with the communication system of FIG. 1 in accordance with a preferred embodiment of the present invention.

FIG. 6 is an electronic block diagram of the communication device 60 for use with the communication system of FIG. 1 in accordance with a preferred embodiment of the present invention. It will be appreciated by one of ordinary skill in the art that the electronic block diagram of FIG. 6 is illustrative of each of the plurality of communication devices 75 assigned for use in the communication system 10.

Referring to FIG. 6, the communication device 60 includes a first device antenna 355, a second device antenna 360, a device receiver 365, a device transmitter 370, a device clock 375, a device processor 380, a device memory 385, an alert circuit 390, a device display 395, a device user interface 400, and a device messaging application 405. It will be appreciated by one of ordinary skill in the art that the device messaging application 405 can be a software program or any other equivalent.

The first device antenna 355 intercepts transmitted signals from the communication system 10. The first device antenna 355 is coupled to the device receiver 365, which employs conventional demodulation techniques for receiving the communication signals transmitted by the communication system 10 such as the downlink message 65 of FIG. 1.

Coupled to the device receiver 365, is the device processor 380 utilizing conventional signal-processing techniques for processing received messages. Preferably, the device processor 380 is similar to the MC68328 micro-controller manufactured by Motorola, Inc. of Schaumburg, Ill. It will be appreciated by one of ordinary skill in the art that other similar processors can be utilized for the device processor 380, and that additional processors of the same or alternative type can be utilized as required to handle the processing requirements of the device processor 380.

The device processor 380 decodes an address in the demodulated data of the received message, compares the decoded address with one or more addresses such as the address 100 stored in an address memory 410 of the device memory 385; and when a match is detected, proceeds to process the remaining portion of the received message.

To perform the necessary functions of the communication device 60, the device processor 380 is coupled to the device memory 385, which preferably includes a random access memory (RAM), a read-only memory (ROM), and an electrically erasable programmable read-only memory (EEPROM)(not shown). The device memory 385 is comprised of the address memory 410, a message memory 415, and a device contact memory 420.

The device contact memory 420 preferably provides memory storage for the plurality of user status information 230, the plurality of user settings 210, and the plurality of contacts 215 for each contact within the device's contact list as described in reference to FIG. 3. It will be appreciated by one of ordinary skill in the art that alternatively a portion of information can be stored. Upon connection to the messaging server 120, the communication device 60 can retrieve a portion of the information associated with the messaging user 205 from the server memory 160. The portion is stored in the device memory 415 of the communication device 60. The messaging server 120 and/or the communication device 60 can use the notification settings 245 and/or the notification rules 260 to determine what portion of the information is communicated from the messaging server 120 to the communication device 60. The portion determined will differ over time based on the time of last contact 235 and other contact information 225.

Upon receipt and processing of a message, the device processor 380 preferably generates a command signal to the alert circuit 390 as a notification that the message has been received and stored. The alert circuit 390 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 390. Preferably, and in accordance with the present invention, the command signal to the alert circuit 390 for notification of receipt and storage of a screen saver message differs from the command signal to the alert circuit 390 for notification of receipt and storage of a traditional message.

Upon receipt of a message, the device processor 380 preferably also generates a command signal to the device display 395 to generate a visual notification of the receipt and storage of the message. When the device display 395 receives the command signal from the device processor 380 that the message has been received and stored, a message indication is displayed. The message indication, for example can be the activation of one of a plurality of message icons on the device display 395. Preferably, and in accordance with the present invention, the message indication for a notification of receipt and receipt and storage of a screen saver message differs from the message indication for notification of receipt and storage of a traditional message. The device display 395 can be, for example, a liquid crystal display, a dot matrix display, or an equivalent.

In a preferred embodiment, the communication device 60 includes the device messaging application 405. The device messaging application 405 is programmed to process contact information received by the device receiver 365 and/or stored in the device contact memory 420, and to identify contact messages to be displayed to the communication device user on the device display 395. The device messaging application 405 can be hard coded or programmed into the communication device 60 during manufacturing, can be programmed over-the-air upon customer subscription, or can be a downloadable application. It will be appreciated by one of ordinary skill in the art that other programming methods can be utilized for programming the device messaging application 405 into the communication device 60.

The device messaging application 405, in response to a processor command, preferably accesses the device contact memory 420 of the device memory 385. The device messaging application 405 is programmed with a set of rules identifying the management of the one or more of the plurality of contacts 215 received by the device receiver 365 and/or stored in the device contact memory 420. The set of rules, for example, can be the plurality of notification rules 260 and/or the plurality of visibility rules 265 as described herein in reference to FIG. 4.

Preferably, the device user interface 400 is coupled to the device processor 380, as shown in FIG. 6. The device user interface 400 can be one or more buttons used to generate a button press, a series of button presses, a voice response from the communication device user, or some other similar method of manual response initiated by the communication device user of the communication device 60. The device processor 380, in response to the device user interface 400, initiates a processor command to the device messaging application 405 when the user input indicates a requested device messaging application 405 function from the communication device user. The device messaging application 405, in response to the processor command can alter the displayed messages and/or contact information. When displaying the contacts, the order of display of the periodic contacts can be affected by the current priority setting 280. For example, the periodic contacts with the highest current priority setting 280 can be listed first and/or only the ten (10) periodic contacts with the highest current priority setting 280 are displayed.

The device processor 380, in response to the device user interface 400, can alternatively process a message entry when the user input indicates a requested message entry from the communication device user. For example, when the device user interface 400 includes a keypad, the communication device user can type a message to be sent using the keypad. In response to the received user input, the device processor 380 sends a command to the transmitter 370.

The device transmitter 370 is coupled to the device processor 380 and is responsive to commands from the device processor 380. When the device transmitter 370 receives a command from the device processor 380, the device transmitter 370 sends a signal via the device second antenna 360 to the communication system 10. The signal, for example, can be the uplink message 85. (see FIG. 1).

In an alternative embodiment (not shown), the communication device 60 includes one antenna performing the functionality of the first device antenna 355 and the second device antenna 360. Further, the communication device 60 alternatively includes a transceiver circuit performing the functionality of the device receiver 365 and the device transmitter 370. It will be appreciated by one of ordinary skill in the art that other similar electronic block diagrams of the same or alternate type can be utilized for the communication device 60 to handle the requirements of the communication device 60.

The present invention as described herein provides a system for providing dynamic management of contacts and method. Although the invention has been described in terms of preferred embodiments, it will be obvious to those skilled in the art that various alterations and modifications can be made without departing from the invention. Accordingly, it is intended that all such alterations and modifications be considered as within the spirit and scope of the invention as defined by the appended claims.

What is claimed is:

1. A communication system for providing dynamic management of a plurality of contacts, the communication system comprising;

a messaging server for managing communication of a plurality of electronic messages among a plurality of communication devices, wherein the messaging server comprises:

a server memory for storing a plurality of contacts, a plurality of user status information, and a plurality of user settings for at least one messaging user, and further for storing a plurality of contact information for at least one contact of the plurality of contacts, and a server messaging application for dynamically managing the plurality of contacts for each messaging user by using the plurality of contact information for a predetermined contact and the plurality of user settings of the messaging user to determine a current priority setting for the predetermined contact for indicating a desired interest by the messaging user in contacting the predetermined contact; and at least one communication device of the plurality of communication devices for use by the at least one messaging user for receiving the plurality of contacts and the plurality of contact information from the messaging server, wherein the plurality of contact information are selected from a group consisting of a plurality of current data, a plurality of contact settings, a plurality notification rules, a plurality of visibility rules, a plurality of notification settings, and a plurality of visibility settings, wherein the plurality of contact settings are selected from a group consisting of a periodic setting, a desired contact period, a plurality of priority settings, a linger time, one or more triggers, one or more categories, one or more presentation settings, an attack time, and a decay time, and wherein the plurality of priority settings are selected from a group consisting of a post contact priority, a contact desired priority, and a minimum priority.

2. A communication system for providing dynamic management of a plurality of contacts as recited in claim 1 wherein the plurality of user status information are selected from the group consisting of a current location of the messaging user, a presence status of the messaging user, a mood of the messaging user, an availability of the messaging user, and a communication method for the messaging user.

3. A communication system for providing dynamic management of a plurality of contacts as recited in claim 1 wherein the plurality of user settings are selected from a group consisting of text font attributes, filter settings, blocking settings, alert settings, and display settings.

4. A communication system for providing dynamic management of a plurality of contacts as recited in claim 3 wherein the plurality of user settings further include one or more maximum settings that limit a number of the plurality of contacts that can be given certain attributes, wherein the one or more maximum settings are selected from a group consisting of a maximum number of mobile contacts for limiting the number of the plurality of contacts that can be uploaded to a messaging user's mobile communication device, a maximum number of audibly alerted contacts for limiting the number of the plurality of contacts for which a change in contact status information will cause an audible alert, a maximum number of subscribed to contacts for limiting the number of the plurality of contacts for which changes in contact status information are delivered to the messaging user's mobile communication device.

5. A communication system for providing dynamic management of a plurality of contacts as recited in claim 1 wherein the plurality of current data are selected from a group consisting of time of last contact between the messaging user and the predetermined contact, and a plurality of contact user status information associated with the predetermined contact.

6. A communication system for providing dynamic management of a plurality of contacts as recited in claim 5 wherein the server messaging application is programmed to change the current priority setting dependent upon time since the time of last contact between the predetermined contact and the messaging user.

7. A communication system for providing dynamic management of a plurality of contacts as recited in claim 5 wherein the plurality of contact user status information are selected from a group consisting of a current location of the predetermined contact, a presence status of the predetermined contact, an availability of the predetermined contact, a communication method for the predetermined contact, and a mood of the predetermined contact.

8. A communication system for providing dynamic management of a plurality of contacts as recited in claim 1 wherein the plurality of current data includes a pointer for accessing a plurality of contact user status information.

9. A communication system for providing dynamic management of a plurality of contacts as recited in claim 1 wherein the plurality of current data includes the current priority setting wherein the current priority setting of each of the plurality of contacts is determined using the plurality of contact information.

10. A communication system for providing dynamic management of a plurality of contacts as recited in claim 1, wherein the server messaging application is programmed to set the current priority setting to the post contact priority when a time since time of last contact is within the linger time.

11. A communication system for providing dynamic management of a plurality of contacts as recited in claim 1 wherein when a time since time of last contact is within the decay time, the server messaging application is programmed to decrease the current priority setting dependent upon an elapsed time since an end of the linger time such that the current priority setting is at a minimum priority setting at an end of the decay time and remains there until commencement of the attack time.

12. A communication system for providing dynamic management of a plurality of contacts as recited in claim 1 wherein the one or more triggers identify thresholds for the current priority setting, above and/or below which one or more settings such as one or more of the plurality of notification settings will be changed for the predetermined contact.

13. A communication system for providing dynamic management of a plurality of contacts as recited in claim 12 wherein the server messaging application is programmed to change the plurality of notification settings based on each of the one or more triggers as the current priority setting changes.

14. A communication system for providing dynamic management of a plurality of contacts as recited in claim 1 wherein when a time since time of last contact is within the attack time, the server messaging application is programmed to increase the current priority setting dependent upon elapsed time since the attack time began such that the current priority setting is at the contact desired priority at an end of the attack time.

15. A communication system for providing dynamic management of a plurality of contacts as recited in claim 1, wherein die one or more presentation settings include a font, color, and graphical image to be displayed in associate with the predetermined contact, and further wherein the one or more presentation settings are dependent upon the current priority setting of the predetermined contact.

16. A communication system for providing dynamic management of a plurality of contacts as recited in claim 1 wherein the plurality of notification settings are selected from a group consisting of a notification elating mechanism, a notification display mechanism, one or more notification triggers, and one or more notification devices.

17. A communication system for providing dynamic management of a plurality of contacts as recited in claim 16 wherein the one or more notification triggers are selected from a group consisting of which portion of the plurality of current data should cause notifications, if and when availability changes trigger notifications, if and when presence changes trigger notification, and which of the predetermined contact's communication devices can trigger a notification.

18. A communication system for providing dynamic management of a plurality of contacts as recited in claim 1 wherein the plurality of notification rules are used to translate the plurality of contact settings and the plurality of current data into thy plurality of notification settings.

19. A communication system for providing dynamic management of a plurality of contacts as recited in claim 1 wherein the plurality of visibility settings are selected from a group consisting of an alerting mechanism, a display mechanism, one or more visibility triggers, and one or more visibility devices.

20. A communication system for providing dynamic management of a plurality of contacts as recited in claim 19 wherein the one or more visibility triggers are selected from a group consisting of which portion of the plurality of user status information associated with the messaging user should be visible to the contact, if and when availability of the messaging user changes should be visible to the contact, if and when presence of the messaging user should be visible to the contact.

21. A communication system for providing dynamic management of a plurality of contacts as recited in claim 1 wherein the plurality of visibility rules are used to translate the plurality of contact settings and the plurality of current data into the plurality of visibility settings.

22. A communication system for providing dynamic management of a plurality of contacts as recited in claim 1 wherein the communication device comprises:

a device receiver for receiving messages including the plurality of contacts and the plurality of contact information, a device transmitter for transmitting one or more messages, a device memory for storing the plurality of contacts and the plurality of contact information for the messaging user of the communication device, and a device messaging application, wherein the device messaging application is programmed to dynamically manage the plurality of contacts for a predetermined messaging user by using the plurality of contact information for each contact and the plurality of user settings of the predetermined messaging user to determine a current priority setting for each contact.

23. A communication system for providing dynamic management of a plurality of contacts as recited in claim 22 wherein the device messaging application is programmed to change the current priority setting dependent upon time since last contact between the predetermined contact and the predetermined messaging user.

24. A communication system for providing dynamic management of a plurality of contacts as recited in claim 1 wherein the communication device comprises:

means for identifying a plurality of contacts for communicating with, the plurality of contacts being stored within the messaging server and external to the communication device;

means for setting a plurality of user settings to identify a varying subset of the plurality of contacts;

means for receiving and storing the varying subset of the plurality of contacts and for receiving a plurality of contact information for each contact of the received varying subset of the plurality of contacts; and means for changing the plurality of user settings in order to vary the subset of the plurality of contacts.

25. The communication device of claim 24 wherein the plurality of contact information comprises time of last contact between a predetermined messaging user and the predetermined contact and wherein time of last contact is used to determine the subset of the plurality of contacts.

26. In a communication device for use in a communication system for providing dynamic management of a plurality of contacts, a method comprising:

defining a plurality of contacts for a messaging user of the communication device;

for one or more of the plurality of contacts, defining a desired contact period indicating how often that communication with each of the plurality of contacts is desired;

during the desired contact period, varying one or more contact priority settings for indicating a desired interest in contacting one or more of the plurality of contacts at predetermined points in the desired contact period;

communicating with a contact;

adjusting the one or more contact priority settings to a level for the one or more of the plurality of contacts, and decreasing the level at a decay rate after the linger time has elapsed.

27. The method of claim 26 wherein the one or more contact priority settings changes an order of the plurality of contacts in a manner that correlates to a desire to have contact with the one or more of the plurality of contacts.

28. The method of claim 26 wherein the one or more contact priority settings changes one or more notification settings of the communication device.

29. The method of claim 28 wherein one of the one or more notification settings of the communication device further comprises a setting that adds an additional communication device for use by the messaging user within the communication system to receive notification about the one or more of the plurality of contacts.

30. The method of claim 28 wherein one of the one or more notification settings includes adding an additional communication device that a person within the plurality of contacts with whom contact is desired can use to trigger a notification.

31. The method of claim 26 wherein the one or more contact priority settings changes one or more visibility settings of the communication device.

32. The method of claim 27 wherein one or more of the plurality of contacts are removed from the communication device and replaced with additional contacts in response to reordering the one or more of the plurality of contacts.

33. The method of claim 26 wherein the plurality of contacts comprises a list of people comprising a buddy list.

34. The method of claim 26 further comprising implementing communication with the one or more of the plurality of contacts by using either one of two different communication media available within the communication system.

35. The method of claim 26 further comprising implementing the desired contact period beginning from a time of last contact with the one or more of the plurality of contacts.

36. The method of claim 26 further comprising if no communication with a desired contact occurs during the desired contact period, continuing to vary one or more user settings subsequent to the desired contact period.

* * * * *